Feb. 5, 1952 — C. D. BRANSON — 2,584,418
CONSTANT FLOW VALVE
Filed April 19, 1948
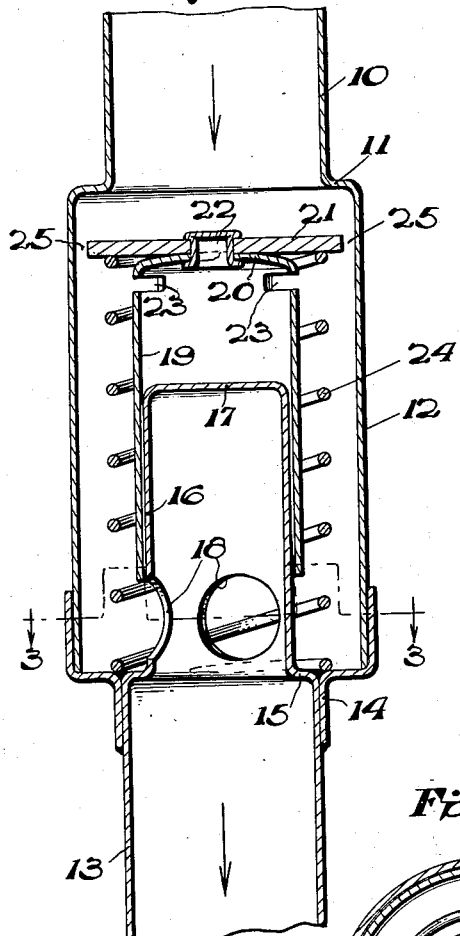
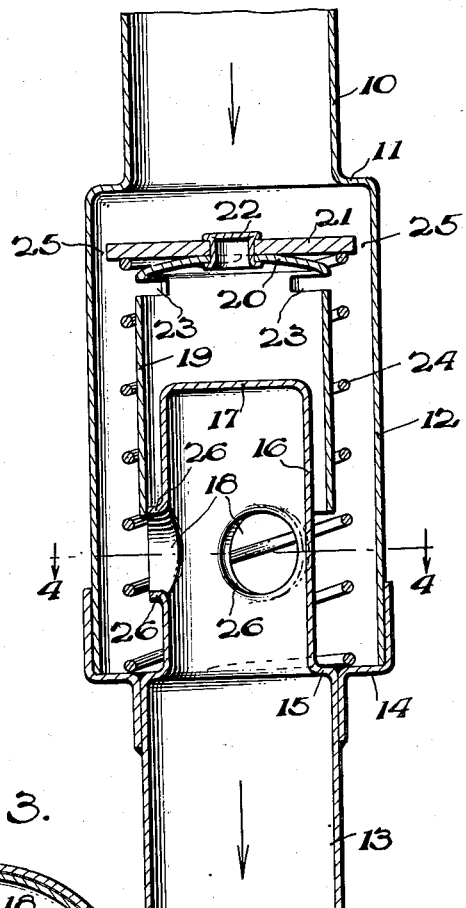
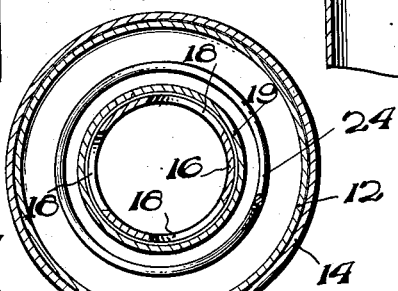
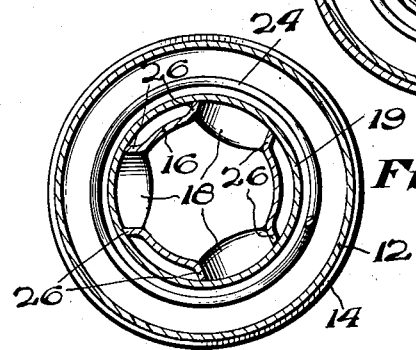
Inventor
Charles D. Branson.
By Cameron, Kerkam & Sutton
Attorneys

UNITED STATES PATENT OFFICE 2,584,418

CONSTANT FLOW VALVE

Charles D. Branson, Knoxville, Tenn., assignor to Robertshaw-Fulton Controls Company, Knoxville, Tenn., a corporation of Delaware Application April 19, 1948, Serial No. 21,799

5 Claims. (Cl. 137—152)

This invention relates to valves for providing a constant flow of fluid in pipes and other passages irrespective of changes in fluid pressure in the pipe or passage.

It is a well known physical theorem that a constant flow of fluid through an orifice of fixed size is obtained when the pressure differential across such an orifice is constant. This theorem has been utilized in various mechanical devices for obtaining a constant flow of fluid through a fixed orifice by adjusting the pressure on the discharge side of the orifice to compensate for pressure changes on the supply side of the orifice to maintain a constant differential therebetween. In certain of these devices a pressure responsive means such as a corrugated expansible and contractible metallic vessel is subjected to the pressures on the supply side of the orifice and actuates a valve on the discharge side of the orifice. An increase of pressure on the supply side of the orifice actuates such means to throttle down its associated valve to increase the pressure on the discharge side of the orifice to maintain the pressure differential across the orifice constant. The reverse of this action occurs when the pressure on the supply side of the orifice decreases and the pressure on the discharge side is decreased commensurately to maintain the pressure differential constant. Pistons, diaphragms and other similar mechanical devices have also been employed in place of the corrugated vessel, and in certain installations the discharge pressures have been employed to modulate supply pressures to maintain the desired constant pressure differential.

All of these prior devices have been subject to certain disadvantages either in uniformity of operation, complexity of construction, bulkiness, or cost of manufacture and maintenance. All of these disadvantages are overcome by the present invention which affords advantages not heretofore available in known structures as will more fully appear hereinafter.

It is accordingly an object of the present invention to provide a novel constant flow control valve in which pressure variations on the supply side of an orifice of fixed area are used to modulate the flow on the discharge side of the orifice to maintain a constant pressure differential across the orifice.

Another object is to provide such a valve which is of positive, certain and uniform operation.

Another object is to provide such a valve which is of simple construction.

Another object is to provide such a valve which is compact and cheap to manufacture.

Another object is to provide such a valve which has a minimum of maintenance requirements and costs.

Another object is to provide such a valve which will act as a check valve of the poppet type when the pressure on the supply side of the orifice falls below a predetermined minimum or it may be a double seated poppet type valve.

Another object is to provide such a valve which is readily adapted for a wide variety of types of installations wherein a constant flow of fluid is desired.

Other and further objects of the present invention will appear from the following description.

My invention is capable of various mechanical embodiments two of which are shown in the accompanying drawing and are described hereinafter to illustrate the same. These illustrative embodiments of my invention should in no way be construed as defining or limiting the invention reference being had to the appended claims for this purpose.

In the drawings, in which like reference characters designate like parts,

Fig. 1 is a cross sectional elevation of one embodiment of my invention showing one of the relative positions of the several parts when the pressure drop across the orifice is at the desired value;

Fig. 2 is a cross sectional elevation of a modification of the embodiment of Fig. 1;

Fig. 3 is a cross section of the embodiment of Fig. 1 on the line 3—3 thereof; and Fig. 4 is a cross section of the embodiment of Fig. 2 on the line 4—4 thereof.

Referring now more particularly to Figs. 1 and 3, a suitable supply pipe 10 for fluid under pressure is shown as expanded at shoulder 11 to provide an enlarged cylindrical chamber 12. Discharge pipe 13 is connected to chamber 12 by any suitable coupling 14. Discharge pipe 13 as illustrated is reduced in diameter at 15 to form a cylindrical extension 16 closed at its end 17. One or more openings 18 are provided in extension 16 at any suitable location, here shown as adjacent its base. A tubular sleeve valve member 19 surrounds extension 16 and is free to reciprocate thereon. Valve member 19 is shown as closed at 20 and has a disk 21 suitably secured thereto as by a rivet 22. Member 19 has one or more apertures 23 beneath disk 21 and is of such a length that disk 21 can engage shoulder 11 to act as a check valve when there is no pressure in pipe 10. The length of member 19 is also so chosen that disk 21 can move an appreciable distance away from shoulder 11 before the areas of openings 18 are affected and thereafter it will cooperate with said openings within the expected range of variations in fluid pressure, operating as a sleeve valve to vary the effective areas of said openings as hereinafter explained. A suitable spring 24 surrounds extension 16 and member 19 and as shown bears at one end on coupling 14 and at the other end on the underside of disk 21. The tension of spring 24 is so chosen as to give the desired pressure drop across the orifice as will appear from the ensuing explanation. Disk 21 is shown as having a loose fit in chamber 12, its clearance therein being so chosen as to provide an orifice 25 of desired constant area, but as will be apparent the disk may be guided in said chamber and the orifice provided in any other suitable way.

With this embodiment of my invention organized as described, when the fluid in pipe 10 is under a pressure less than the pressure of spring 24, spring 24 will urge disk 21 into engagement with shoulder 11 to act as a poppet valve effectively sealing pipe 10. Disk 21 will continue to act as a check valve until the fluid pressure in pipe 10 exceeds the strength of spring 24. At this time disk 21 will move away from shoulder 11 and open orifice 25, allowing fluid under pressure to pass through orifice 25 and enter the space between member 19 and the wall of chamber 12 whence it will pass through the apertures 23 to exert a uniform pressure on the under surface of disk 21. Disk 21 continues to move down against the tension of spring 24 until the pressure exerted on the upper surface of disk 24 is equal and opposite to the pressure acting on the under surface of disk 21 plus the force exerted by spring 24. In this position the open end of valve member 19 has been moved into cooperative relationship with the openings 18 and is conditioned to vary the effective area thereof upon variations in the pressure of the fluid flowing to and through the orifice 25. As the fluid pressures acting on the opposite sides of disk 21 are equal and opposite so that disk 21 is acting as a balanced valve member, it is apparent that the pressure differential across orifice 25 is determined by the force exerted by spring 24. Movement of disk 21 on increases of pressure in pipe 10 will move member 19 to decrease the effective area of openings 18, rapidly building up the pressure exerted on the underside of diaphragm 21 and countering the increase of pressure in pipe 10 to balance the fluid pressures on said disk and thereby maintain the pressure differential across orifice 25 at that value which is determined by spring 24. When the pressure drops in pipe 10, spring 24 will force disk 21 and member 19 upwardly, increasing the effective area of the openings 18 to reduce the pressure on the underside of disk 21 and counter the decrease of pressure in pipe 10, again balancing the fluid pressures on the disk 21 so as to maintain the pressure differential across orifice 25 at that value which is determined by spring 24.

The embodiment of Figs. 2 and 4 functions in exactly the same manner as described for the embodiment of Fig. 1. When controlling the flow of fluids containing impurities or other granular material which might lodge between extension 16 and valve member 19 with the danger that the action of the valve might be modified or destroyed it is advisable to allow an increased clearance between these elements. To provide this clearance and prevent chattering of the elements element 19 is shown as of increased diameter with respect to extension 16 and the openings 18 are peened outwardly at 26 to slidingly engage member 19.

While in the embodiment illustrated the pressure on the discharge side of the orifice 25 is shown as admitted to the underside of the disk through apertures 23 in the valve member 19, it will be apparent to those skilled in the art that any other suitable construction may be used in order that the fluid pressure at the discharge side of said orifice be applied to the side of disk 21 which is opposite that subjected to the supply pressure so as to secure the balance of fluid pressures whereby the valve will operate as herein explained. It will also be apparent that if desired a second seat for the disk 21 may be provided so that it may function as a double seated poppet type valve.

It will now be apparent that by the present invention I have provided a novel constant flow control valve in which pressure variations on the supply side of an orifice of fixed area are used to modulate the flow on the discharge side of the orifice to maintain a constant pressure differential across the orifice; which is of positive, certain and uniform operation; which is of simple construction; which is compact and cheap to manufacture; which requires minimum maintenance and has minimum maintenance costs; which acts as a check valve, and which is readily adapted for use in a wide variety of systems requiring a constant flow of fluid.

Changes to or modifications of the above described illustrative embodiment of my invention may now be suggested to those skilled in the art without departing from my inventive concept. Reference should therefore be had to the appended claims to determine the scope of this invention.

What is claimed is:

1. In a constant flow control valve, a supply pipe, a discharge pipe, a valve housing connecting said pipes, a closed extension of said discharge pipe in said housing in communication with said housing through a ported side, a valve element surrounding said extension and mounted for reciprocation thereon to vary the effective area of the port in said extension, a disk in the supply side of said housing secured to the end of said element and providing a predetermined orifice between its periphery and the walls of said housing, said disk having at opposite sides thereof substantially equal areas respectively subjected to the pressures on the supply and discharge sides thereof, and a spring surrounding said element and said extension and bearing upon said disk to urge said disk toward said supply pipe.

2. In a constant flow control valve, a supply pipe, a discharge pipe, a valve housing connecting said pipes, a disk mounted for reciprocation in the supply side of said housing and providing a constant area orifice between its periphery and the walls of said housing, said disk having substantially equal areas at the opposite sides thereof subjected respectively to the supply and discharge pressures, a sleeve valve element connected to said disk, a ported member in communication with said discharge pipe and with which said sleeve valve element cooperates by reciprocation thereon, and resilient means for urging said disk toward said supply pipe.

3. A control valve as described in claim 2 in which said sleeve valve element is ported adjacent the underside of said disk to equalize fluid pressures acting thereon.

4. A control valve as described in claim 2 in which the ports of said member in communication with said discharge pipe have outwardly extending edges to bear against said sleeve.

5. In a constant flow control valve, a supply pipe, a discharge pipe, a valve housing connecting said pipes, a closed extension of said discharge pipe in said housing in communication with said housing through a ported side, a sleeve slidably mounted on said extension for reciprocation thereon to vary the effective area of the port in said extension, a disk operatively connected to said sleeve for reciprocable movement therewith and disposed in the supply side of said housing, said disk providing a constant area orifice between its periphery and the walls of said housing and having substantially equal areas at the opposite sides thereof respectively subjected to the supply and discharge pressures, and resilient means for urging said disk toward said supply pipe.

CHARLES D. BRANSON.

REFERENCES CITED

The following references are of record in the file of this patent:

UNITED STATES PATENTS

| Number | Name | Date |
| --- | --- | --- |
| 780,986 | Francis | Jan. 31, 1905 |
| 1,579,251 | Schossow | Apr. 6, 1926 |
| 1,933,852 | Hahn | Nov. 7, 1933 |
| 2,069,022 | Sisk | Jan. 26, 1937 |
| 2,307,949 | Philips | Jan. 12, 1943 |
| 2,321,573 | Chase | June 15, 1943 |